Fig.1

INVENTOR.
Richard J. Millenaar

Oct. 13, 1964 R. J. MILLENAAR 3,152,358
SAUSAGE LINKING MACHINE
Original Filed Jan. 12, 1959 6 Sheets-Sheet 2

INVENTOR.
Richard J. Millenaar,
BY
Cromwell, Grunt + Warden
attys

United States Patent Office 3,152,358
Patented Oct. 13, 1964

3,152,358
SAUSAGE LINKING MACHINE
Richard J. Millenaar, Madison, Wis., assignor to Oscar Mayer & Co., Inc., Chicago, Ill., a corporation of Illinois
Original application Jan. 12, 1959, Ser. No. 786,168, now Patent No. 3,059,272, dated Oct. 23, 1962. Divided and this application Sept. 24, 1962, Ser. No. 231,608
12 Claims. (Cl. 17—34)

This invention relates to the manufacture of sausages of a character in which relatively long lengths of filled or stuffed casing are divided into links by constricting the casing at intervals corresponding to the desired length of the sausages and the links are held in connected relation while they are processed in a continuous non-interrupted manner.

It is a general object of the invention to provide a sausage linking machine which will automatically divide a filled or stuffed casing into sections of predetermined length by constricting the casing at intervals to thereby form the stuffed casing into links and which will hold the connected links in a continuous string while they are carried through a series of chambers for smoking and cooking the same.

It is a further object of the invention to provide a sausage linking machine which comprises in combination a conveyor mechanism for receiving a plurality of filled sausage casings which are fed thereto in generally parallel relation, the conveyor having link forming bar assemblies carried thereon and associated mechanism for constricting the casings at predetermined intervals to form therein links of uniform size, and mechanism for locking the constricted casing areas connecting the links in constricted relation while the conveyor advances through a series of processing chambers for processing the links in a continuous manner.

It is another object of the invention to provide in a sausage linking machine a casing divider mechanism comprising a conveyor having longitudinally spaced cross bars with a plurality of upwardly opening slots with generally V-shaped edge portions and a mechanism associated therewith for forcing the casing into the slots to constrict the same and divide the casings into a series of connected links and a locking device movably mounted on the cross bars for holding the constricted casing sections in constricted relation while the conveyor carries the same through a series of processing chambers.

It is still another object of the invention to provide in a sausage linking machine a casing dividing mechanism which comprises a conveyor mechanism for receiving a plurality of filled sausage casings which are fed thereto in generally parallel relation, which conveyor mechanism has link forming bars with upwardly opening V-shaped slots, a mechanism for forcing the casing into the slots and constricting the casing at predetermined intervals to form therein links of uniform size, and a sliding bar member having hook formations for locking the constricted casing areas in the slots while the conveyor advances through a series of processing chambers.

It is a still further object of the invention to provide in a sausage linking machine a casing dividing and linking mechanism comprising a conveyor having longitudinally spaced cross bars with a plurality of upwardly opening slots in their outer edges, which slots have converging edges terminating in pocket formations, with the material forming the edges of the slots and the pocket formations being resilient, and a mechanism associated therewith for forcing the casing into the pocket formations in the slots so as to constrict the same and divide the casings into a series of connected links, the constricted casing sections being held in constricted relation in the pocket formations by the resiliency of the material while the conveyor carries the same through a series of processing chambers.

This application is a division of application Serial No. 786,168, filed January 12, 1959, now Patent No. 3,059,-272.

These and other objects and advantages of the invention will be apparent from a consideration of the machine which is shown by way of illustration in the accompanying drawings wherein.

Figure 1:
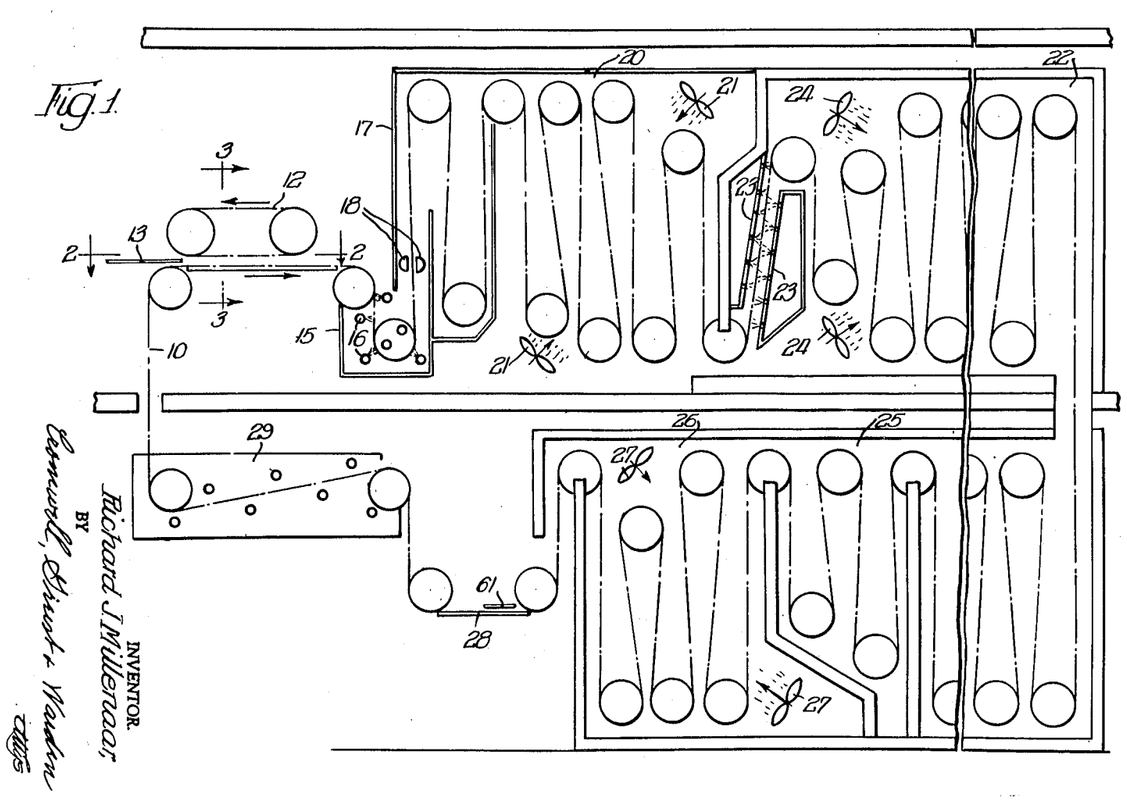
FIGURE 1 is an elevation, largely diagrammatic, illustrating a sausage linking, conveying and processing apparatus which embodies therein the principal features of the invention.
Figure 2:
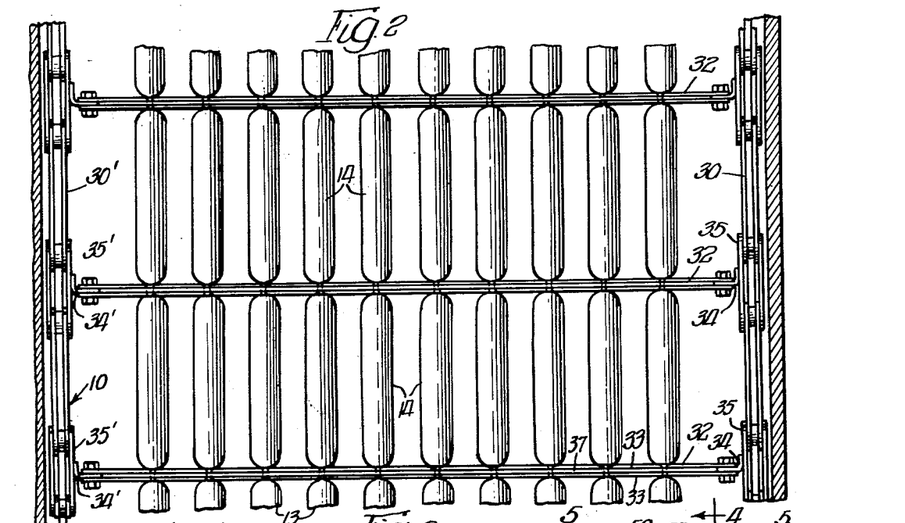
FIGURE 2 is a transverse view taken generally on the line 2—2 of FIGURE 1, to an enlarged scale, showing the sausage carrying conveyor.
Figure 3:
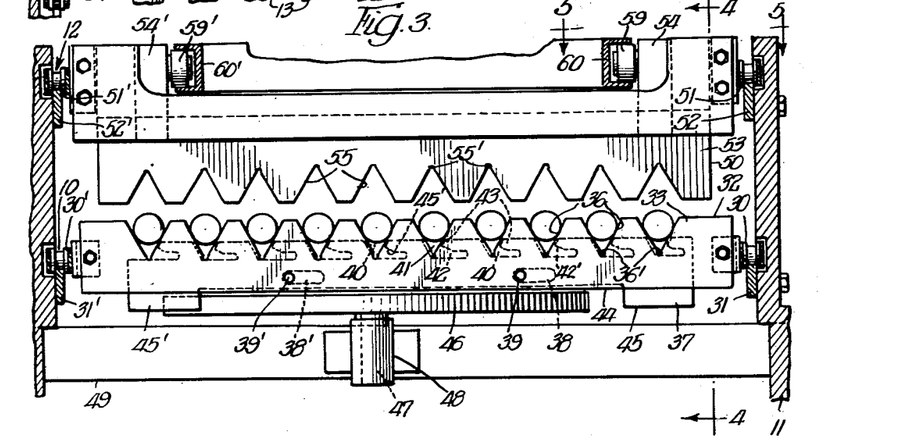
FIGURE 3 is a cross section taken generally on the line 3—3 of FIGURE 1, to an enlarged scale.

The apparatus as illustrated in FIGURE 1 is adapted to process a plurality of stuffed sausage casings which are first divided into link forming sections by constricting the casings at intervals, after which the links are held in connected relation while they are carried through a series of chambers in which they are smoked, cooked and otherwise processed for marketing. The apparatus comprises a continuously traveling chain conveyor 10 (FIG- URES 1, 2 and 3) which is mounted on a plurality of supporting sprockets, certain of which are located in adjoining processing chambers. The conveyor 10 has a horizontally disposed upper run or stretch at one end of the apparatus which is supported on an upright frame 11, the latter also supporting an auxiliary conveyor mechanism 12 having a lower run which travels in a path parallel with the path of the main conveyor 10 for a relatively short distance at what may be termed the linking station. The conveyors 10 and 12 carry cooperaing mechanism for dividing one or more relatively long lengths of a stuffed sausage casing, indicated at 13, into a series of link forming sections 14 which are held on the conveyor 10 and subsequently carried through the processing chambers.

The conveyor 10 advances the casing, after it is divided or linked, to the first chamber 15 in which the links are washed by a spray indicated at 16 and from which they are carried by the conveyor into a conditioning chamber 17, having at the entrance thereto a pair of air blowers 18 between which the conveyor passes to dry the links. A smoking chamber 20, which is supplied with smoke in any convenient manner and which may have air circulating fans 21, adjoins the conditioning chamber 17. The links are smoked as they are carried by the conveyor 10 through the smoking chamber. A cooking chamber 22 adjoins the smoking chamber 20 which has at its entrance heaters, indicated at 23, between which the conveyor 10 travels, and air circulating fans 24. The linked casing is heated as it enters the chamber 22 and then is cooked while it moves through the chamber, passing through a hot shower at the end of the cooking. The conveyor advances from the cooking chamber 22 to a cooling chamber 25 which is provided with a cold shower and then passes through the final processing chamber 26 where cold air is circulated by the fans 27 to chill the smoked and cooked links which are then ready for removal from the conveyor 10. As the conveyor 10 emerges from the final processing chamber 26 along the path indicated at 28 the linked casing is freed from the conveyor 10 for feeding to a stripper (not shown) which removes the links from the casing. The empty conveyor 10 passes through a washing chamber 29 and thence upwardly to the linking station for repeating the cycle.

The conveyor 10 on which the stuffed casing sections are carried through the apparatus comprises a pair of endless chains 30 and 30' which are arranged in transversely spaced parallel relation and supported on suitable sprockets as described, with the chains being supported on guide rails 31 and 31' on the sides of the support frame 11 at the linking station, where the conveyor travels in a horizontal path. A plurality of cross bar assemblies 32 are carried between the chains 30 and 30' in longitudinally spaced relation with the spacing between the assemblies corresponding to the length desired for the links 14.

The cross bar or divided assemblies 32 each comprise two identical plate or bar members 33 arranged in parallel, spaced apart relation. The two bar members 33 of each assembly 32 extend outwardly or upwardly of the conveyor chains 30 and 30' in parallel planes which are normal to the path of travel of the conveyor as the conveyor traverses the support frame 11 at the linking or dividing station. The two bar members 33 are bolted or otherwise secured at their opposite ends to angle brackets 34 and 34' which brackets extend inwardly of the inside plates 35 and 35' of oppositely disposed and aligned links of the chains 30 and 30'.

Each of the bar members 33 is provided along its outer or upper edge with a series of outwardly opening V-shaped slots or notches 36 which slots have their side edges converging in the direction inwardly of the bar and terminating at a rounded semi-circular pocket formation 36'. The slots 36 of each of the two bar members 33 are in alignment in the longitudinal direction of the conveyor and each assembly 32 is arranged with the slots in its bar members 33 of the next adjacent assembly 30 so that when one or more casings 13 are fed longitudinally to the conveyor 10 the casings may be positioned in the aligned slots 36.

Each cross bar assembly 32 includes a neck locking bar 37 which is mounted for sliding movement transversely of the conveyor in the space between the two slotted bar members 33 of the assembly. The locking bar 37 is provided intermediate its top and bottom edges with transversely spaced elongate slots 38 and 38' to receive guide pins 39 and 39' extending between the pair of bar members 33. The upper edge of the neck locking bar 37 is provided with a plurality of generally L-shaped slots 40, each of which have an upwardly opening portion 41 with diverging side edges and corresponding in size approximately to the bottom portion of the slots 36 in the bar members 33. The slot portions 41 also correspond in spacing to the spacing of the slots 36 in the bars 33 so that when the bar 37 is in the inoperative or open position, as shown is FIGURE 3, the portion 41 of each of the slots 40 is aligned with the bottom portion of a pair of the slots 36 in the bars 33 so as not to interfere with the forming of a neck in the casing in the bottom portions 36' of the slots 36. The slots 40 in the locking bar 37 each have a lateral extension 42 spaced below the top edge of the bar with the top edge of the slot tapered somewhat at 42' to form an entrance end and terminating in a rounded pocket at the blind or closed and thereof. The L-shaped slots 40 define on the top marginal portion of the bar member 37 a series of hook formations 43 which extend horizontally above the slot portions 42. The locking bar member 37 has its bottom center margin cut out at 44 to provide two cam forming depending end portions 45 and 45' which are adapted to cooperate with suitable cam members for moving the bar 37 into and out of neck locking position. A cam roller 46 is provided as shown in FIGURE 3 at the dividing station in proper position beneath the conveyor 10 for moving the bar 37 into neck locking position. The roller 46 has a vertical shaft 47 which is supported for free rotation in a bearing 48 mounted on a cross member 49 of the supporting frame 11 and the latter is located so that the bar portion 45' will strike the periphery of the cam roller 46 and cause the bar 37 to move to the left as viewed in FIGURE 3.

Figure 4:
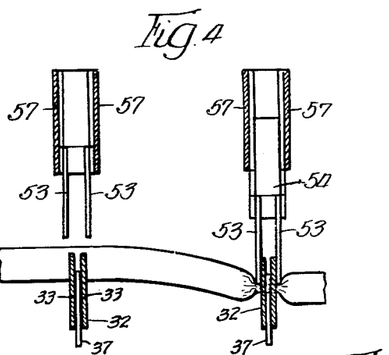
FIGURE 4 is a section taken on the line 4—4 of FIGURE 3.
Figure 5:
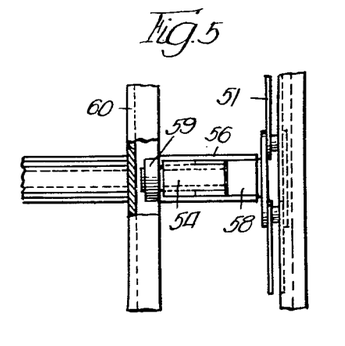
FIGURE 5 is a fragmentary view taken on the line 5—5 of FIGURE 3.
Figure 6:
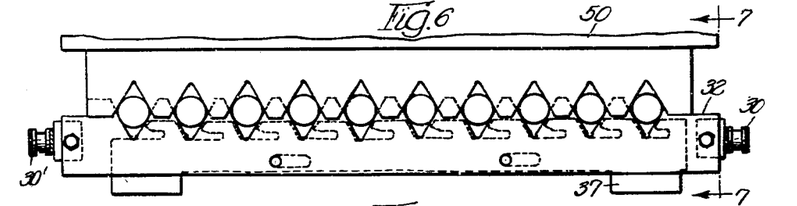
FIGURE 6 is a cross section similar to FIGURE 3 with the neck forming bars positioned at the beginning of the neck forming operation.
Figures 7, 9, 11, 12:
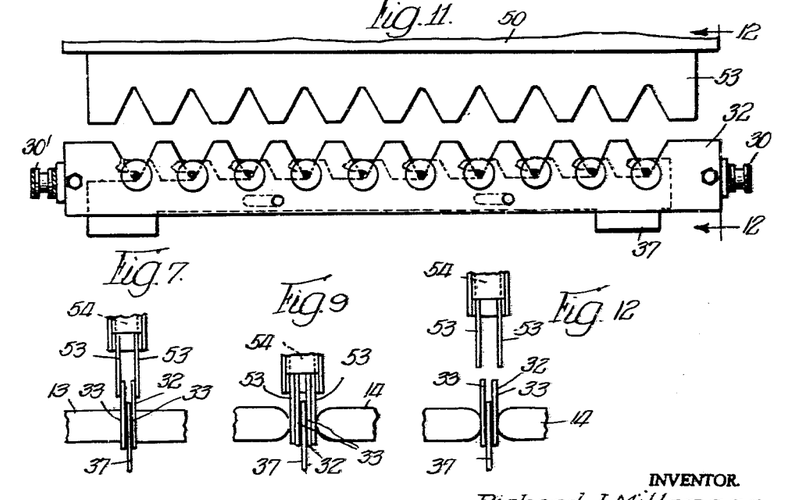
FIGURE 7 is a section taken generally on the line 7—7 of FIGURE 6.
FIGURE 9 is a section taken on the line 9—9 of FIGURE 8.
FIGURE 11 is a cross section similar to FIGURE 10 with the neck forming bars retracted.
FIGURE 12 is a section taken on the line 12—12 of FIGURE 11.
Figure 8:
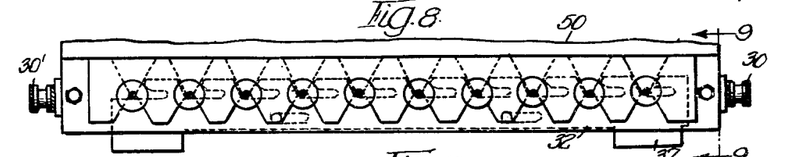
FIGURE 8 is a cross section similar to FIGURE 6 showing the neck forming bars in completely closed position.
Figure 10:
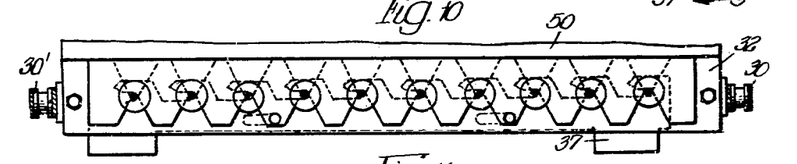
FIGURE 10 is a cross section similar to FIGURE 8 showing the neck locking bar in neck locking position.

The auxiliary conveyor 12 carries a plurality of neck forming assemblies 50 which extend between the laterally spaced pair of conveyor chains 51 and 51', with the latter being carried on support rails 52 and 52' on upstanding side portions of the supporting frame 11. Each assembly 50 comprises a pair of parallel plates or bar members 53 attached at opposite ends to slide blocks 54 and 54'. The bar members 53 are spaced a sufficient distance apart to receive between them an assembly 32 on the conveyor 10 as illustrated in FIGURE 4. The two bar members 53 are each provided on their bottom edges with a pluraltiy of inverted V-shaped slots or notches 55 which have their side edges converging toward each other and terminating in a rounded pocket forming portion 55' at the bottom of the V. The slots 55 are aligned in the longitudinal direction of the conveyor 12 in the same manner as the slots 36 in the bar members 33 of the assemblies 32. The bar members 53 are supported on the conveyor chains 51 and 51' so that each successive assembly 50 may be brought into position immediately over an assembly 32 as shown in FIGURES 3 and 4 with the slots 55 vertically aligned with the slots 36 in the assembly 32. The slide blocks 54 and 54' are mounted for vertical movement in guideways 56 and 56' formed at the opposite ends of a pair of parallel, spaced cross bars 57 which are connected to oppositely aligned links of the chains 51 and 51' by bracket members 58 and 58'. The slide blocks 54 and 54' have cam rollers 59 and 59' mounted at the upper ends thereof which engage in channel shaped cam tracks 60 and 60' for controlling the vertical movement of each assembly 50. Each successive assembly 50 is lowered when moved into vertical alignment with an oncoming assembly 32 on the conveyor 10 and lowered in order to constrict the casing, as illustrated in FIGURES 2 to 8. The assembly 50 is held in lowered position until the neck locking bar 37 is moved into leck engaging position as shown in FIGURES 9 and 10. As soon as the locking bar 37 has been moved into neck locking position the neck forming assembly 50 is raised or withdrawn as shown in FIGURE 11 to free the same from the assembly 32 so as to clear the conveyor 10 as the latter advances the linked casing beyond the dividing or linking station and into the first processing chamber 15.

As the linked casing progresses through the processing chambers the links are completely processed and successive links are carried by the conveyor 10 from the last processing chamber 26 to the conveyor run 28 where the neck locking bar 37 is retracted to its initial non-locking position. A cam for retracting the neck locking bar is indicated at 61 in FIGURE 1 which may be a roller as shown in FIGURE 3 with the same positioned to move the neck locking bar 37 to the right as viewed in FIGURE 3 for releasing the constricted casing sections from the slots 36 in the conveyor assemblies 32 to permit separation of the processed links from the conveyor 10.

Figure 13:
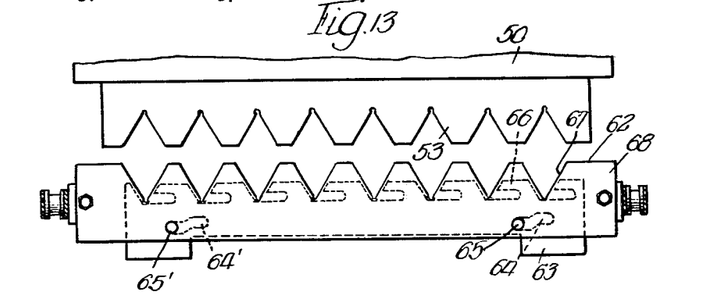
FIGURE 13 is a cross section similar to FIGURE 3 showing a modified form of the apparatus.
Figure 14:
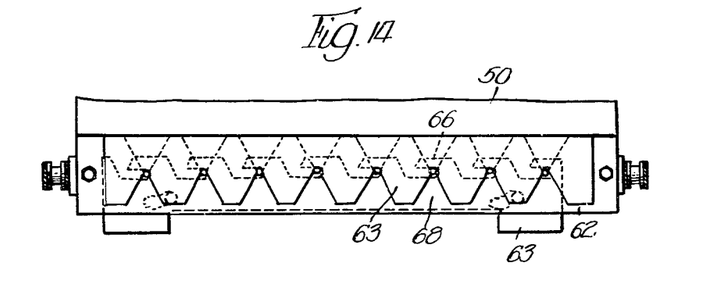
FIGURE 14 is a cross section, as in FIGURE 13, showing the apparatus of FIGURE 13 in neck locking position.
Figure 15:
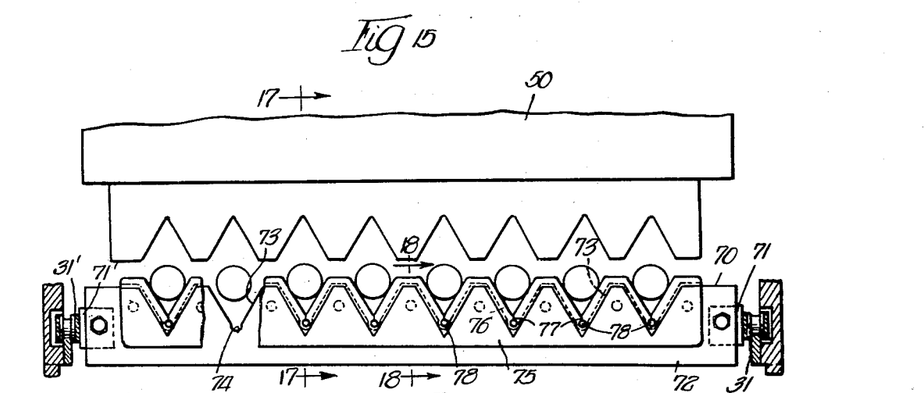
FIGURE 15 is a cross section similar to FIGURE 3 showing a further modified form of the apparatus.
Figure 16:
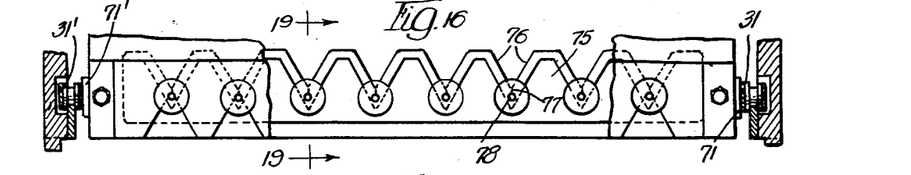
FIGURE 16 is a cross section similar to FIGURE 15 with the neck forming bars in closed position and with portions broken away.
Figure 17:
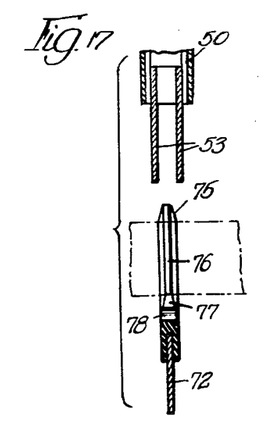
FIGURES 17 and 18 are sections taken on the lines 17—17 and 18—18 of FIGURE 15 to an enlarged scale.
Figure 18:
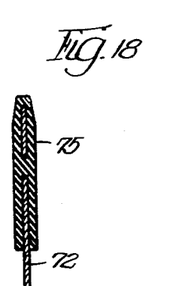
Figure 19:
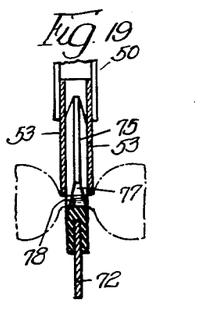
FIGURE 19 is a section taken on the line 19—19 FIGURE 16, to an enlarged scale.

A modified form of the apparatus for dividing the casing is illustrated in FIGURES 13 and 14. In this arrangement, the cross bar assembly 62 which is carried on the conveyor 10 is identical with the assembly 32 of the apparatus shown in FIGURES 2 to 12 except for the mounting of the neck locking bar 63. The bar 63 is identical with the locking bar 37 except for the mounting slots 64 and 64' which are curved downwardly intermediate their ends so as to cause the bar 63 to travel in a diagonal path as it is forced toward the neck engaging position on the supporting pins 65 and 65'. The initial elevation of the bar 63 is such that the neck locking hook formations 66 first move to the left, as viewed in FIGURE 13, above the constricted portions of the casing in the V-shaped slots 67 in the bars 68 and then downwardly into tight engagement with the constricted casing sections. The shape of the guide slots 64 and 64' is such that the initial movement of the bar 63 carries the hook formations 66 across the slots 67 above the constricted casing sections without engagement with the latter so as to eliminate any tendency of the hook formations to cut or tear the casing material when they are moved into locking position.

Another modification of the casing dividing mechanism is illustrated in FIGURES 15 to 19. In this form of the apparatus the conveyor 10 carries between the side chains 31 and 31' a plurality of single cross bars or assemblies 70 which are attached to the chains at their opposite ends by the angle brackets 71 and 71'. The cross bar assemblies 70 are arranged in longitudinally spaced relation in the same manner as in the form shown in FIGURES 1 to 12 so as to provide the size link desired. Each of the cross bar assemblies 70 comprises a plate-like bar 72 having a series of upwardly opening slots 73 in the upper edge thereof which slots 73 have side edges converging downwardly towards a bottom semi-circular pocket-like formation 74. Each bar member 72 has its upper margin encased in a cover member 75 formed of resilient material such as rubber or rubber-like plastic material, for example, neoprene. The cover member 75 which is preferably molded on the bar 72 is formed with upwardly opening V-shaped slots 76 having their side edges converging downwardly towards a vertical slit 77 which terminates at a circular neck forming aperture 78. The aperture 78 forms a pocket for receiving a constricted casing section which constitutes the connecting neck between the adjoining links. Each cross bar assembly 70 is adapted to receive the stuffed casing in the slots 76 with the casing being adapted to be constricted in the same manner as in the form of the apparatus shown in FIGURES 1 to 12 by operation of a neck forming assembly 50 which is mounted on the conveyor 12 so that when lowered toward a cross bar assembly 70 it will constrict the portions of each casing which lie in a slot 76 and force the constricted casing portion through the upper end of the slit 77 and into the neck forming pocket 78 where it is frictionally retained in constricted condition by the resiliency of the member 75. This form of the apparatus eliminates the need for a neck locking bar since the resilient nature of the member 75 holds the neck forming portion of the casing in constricted condition as the conveyor 10 carries the bar assemblies 70 through the processing chambers. At the end of the processing the linked sausages may be removed from the bar assemblies 70 by forcing the constricted casing sections from the pockets 78.

Figure 20:
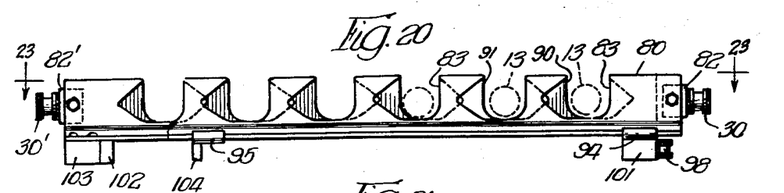
FIGURE 20 is a cross section similar to FIGURE 3 showing another modified form of the apparatus.
Figure 21:
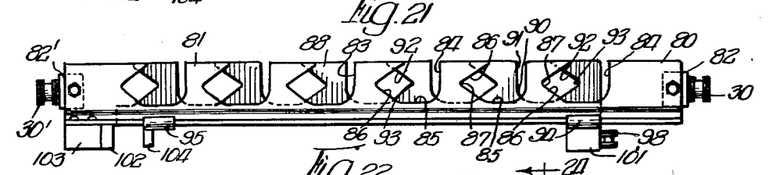
FIGURE 21 is a cross section similar to FIGURE 20 showing the apparatus of FIGURE 20 with the neck forming and locking bar in partially closed position.
Figures 22, 23, 24:
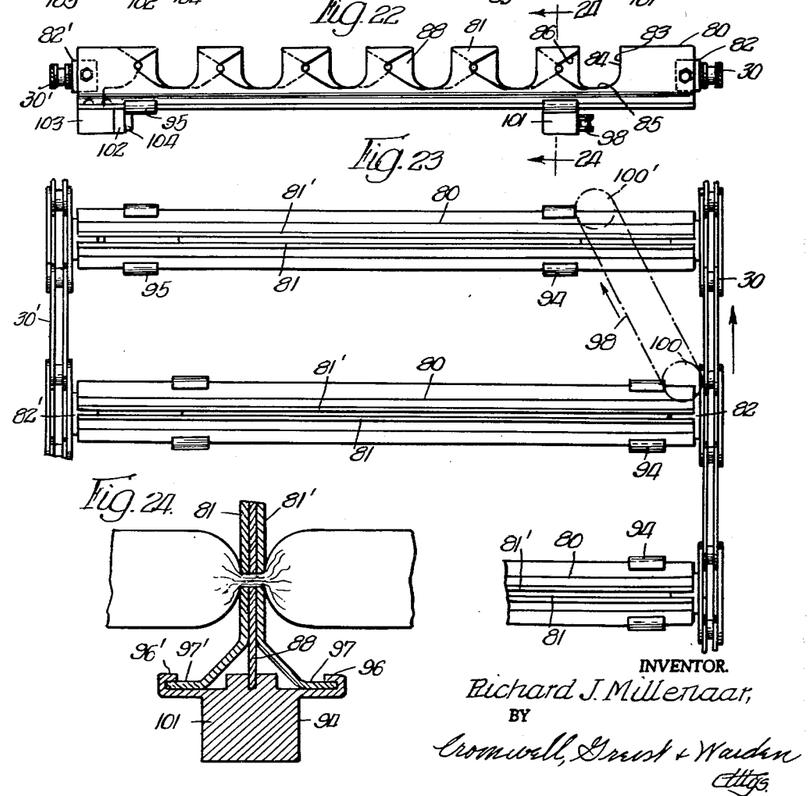
FIGURE 22 is a cross section similar to FIGURE 20 showing the neck forming and locking bar in fully closed position.
FIGURE 23 is a transverse view taken on the line 23—23 of FIGURE 20.
FIGURE 24 is a section taken on the line 24—24 of FIGURE 20.

A further modification of the apparatus is illustrated in FIGURES 20 to 24. In this form of the machine a series of casing dividing and link forming assemblies 80 are carried on the chains 30 and 30' of the conveyor 10 in the same manner as assemblies 32 in the form of the apparatus shown in FIGURES 1 to 12. The cross bar assemblies 80 extend transversely of the conveyor 10 and are spaced longitudinally thereof a distance corresponding to the length of link desired. Each bar assembly 80 comprises a pair of parallel plate-like members 81 and 81' which are spaced apart and secured at their opposite ends to the chains 30 and 30' by attaching brackets 82 and 82'. The plate or bar members 81 and 81' are each provided with a series of spaced slots 83, which open upwardly. Each of the slots 83, as shown in FIGURES 20 to 22, has a vertical side edge 84, a horizontal bottom edge 85 and a V-shaped edge 86 which is opposite the side edge 84 and forms a lateral extension of the slot and which opens in the horizontal direction toward the edge 84. The V-shaped portion of the slot is formed by converging edges which terminate at a rounded pocket formation 87. The slots 83 in the plates 81 and 81' are paired and aligned in the longitudinal direction of the conveyor 10. The width of the opening at the mouth of each slot 83 is greater than the diameter of the stuffed casing 13 so that when a casing is fed to the conveyor 10 it may be positioned in aligned slots 83 (FIGURE 20) in successive assemblies 80 on the conveyor. Each cross bar assembly 80 includes a casing constricting and locking plate or bar 88 which is slidingly mounted between the two members 81 and 81' for movement in the direction transversely of the conveyor. The constricting and locking bar 88 has a series of slots 90 which correspond in shape to the slots 83 in the members 81 and 81' with the slots being arranged in reversed position so that in the open position of the assembly as shown in FIGURE 20 the vertical side edge 91 is opposite the vertical side edge 84 of the slots 83 in the members 81 and 81' while the V-shaped side edges 92 and the pockets 93 face the V-shaped edges 86 and pockets 87 in the bar members 81 and 81' for cooperation therewith in constricting the casing upon relative movement between the member 88 and the two members 81 and 81'. As the bar member 88 is moved to the left in FIGURES 21 and 22, the V-shaped portions 86 and 92 of the slots 83 and 90 close on each other to constrict the casing and reduce the same to the relatively small diameter of the pockets 87 and 93.

The constricting and locking bar member 88 is guided in its opening and closing movement by guide forming bracket members 94 and 95 which are secured to the bottom edge at opposite ends thereof and which have reversely bent guide flanges 96 and 96' adapted to ride on rail forming flange portions 97 and 97' which extend horizontally in opposite directions from the lower edges of the members 81 and 81'. The closing movement of the constricting and locking bar 88 may be effected by an endless chain 98 which is supported beneath the conveyor 10. The chain 98 is mounted on end sprockets 100 and 100' which are arranged in longitudinally and laterally spaced relation so that the chain 98 travels in a diagonal path and in the same direction as the conveyor 10. The chain 98 is arranged as shown in FIGURE 23 in the path of the depending block forming portion 101 of the guide bracket 94 so that as the conveyor 10 advances the guide bracket 94 engages the chain 98 and is forced to the left as viewed in FIGURE 23, thereby moving the bar member 90 in the direction to close the slots and constrict the casing. The bar member 90 may be held in closed position by providing a permanent magnet 102 on a depending bracket 103 which is secured on the bottom flanges 97 and 97' of the members 81 and 81' and at the end of the assembly 80, the magnet 102 being positioned so that it will engage with a depending portion 104 of the guide bracket 95 on the member 88 and hold the latter against movement in the direction to open the slots in the assembly 80. When the processing of the links is completed and the conveyor 10 delivers the processed links from the final processing chamber 26 (FIGURE 1) along the path 28 the successive locking bars 90 may be moved to open position by providing a chain of the same character as the chain 98 for engaging the bracket 94 with its diagonal direction reversed and positioned so as to force the bar member 88 towards the open position which automatically releases the links from the assemblies 80 and permits them to drop out of the slots therein.

While specific materials and particular details of construction are referred to in describing the several forms of the apparatus illustrated, it will be understood that other materials and different details of construction may be resorted to within the spirit of the invention.

I claim:

1. In a sausage linking and treating apparatus, an endless conveyor having spaced side chain members, a plurality of pairs of spaced cross bars carried in longitudinally spaced relation between said side chain members, each pair of said cross bars being longitudinally spaced from the next adjacent pair of cross bars a distance equal to the length of a sausage link, the bars of each pair thereof being provided in the their outer edges with one or more outwardly opening generally V-shaped slots which are in longitudinal alignment and which are adapted to receive a length of stuffed sausage casing, a neck forming cross bar mounted adjacent said conveyor for movement toward and from successive pairs of said slotted cross bars, said neck forming bar having an edge which is opposed to the outer edge of the slotted cross bars and which is adapted to move in a direction normal to the path of movement of the casing so as to force a portion of a stuffed casing into a slot and constrict the same, and a holding bar mounted on the conveyor for movement in a direction transveresly of the conveyor between each pair of slotted cross bars, which holding bar has hook formations for engaging over constricted portions of the casing whereby to hold the casing on the conveyor and permit withdrawal of the neck forming bar.

2. In a sausage linking and treating apparatus, an endless conveyor having spaced side members, a plurality of pairs of spaced cross bars carried in longitudinally spaced relation between said side members, each pair of said cross bars being longitudinally spaced from the next adjacent pair of cross bars a distance equal to the length of a sausage link, the bars of each pair being provided in their outer edges with one or more outwardly opening slots which are in longitudinal alignment and which are adapted to receive a length of stuffed sausage casing for constricting spaced casing portions, a neck forming cross bar mounted adjacent said conveyor for movement toward and from successive pairs of said slotted cross bars, said neck forming bar having an edge which is opposed to the outer edge of the slotted cross bars and which is adapted to move in a direction normal to the path of movement of the casing so as to cooperate with the slotted cross bars to constrict a portion of a stuffed casing and form a neck in the same, and a holding bar mounted on the conveyor for movement between each pair of slotted cross bars which holding bar has slot formations on its outer edge for engaging with constricted portions of the casing whereby to hold the casing on the conveyor and permit withdrawal of the neck forming bar.

3. In a sausage linking and treating apparatus, an endless conveyor having spaced side members, a series of cross bar assemblies carried in longitudinally spaced relation between said side members, each cross bar assembly having a pair of bars which extend in parallel relation outwardly of the conveyor, the bars of each assembly being longitudinally spaced from the nearest bar of the next pair of bars a distance equal to the length of a sausage link, the bars of each pair being provided in their outer edges with one or more outwardly opening slots which have converging side edges and which are in longitudinal alignment so as to receive a length of stuffed sausage casing for dividing the same into links, a neck forming cross bar mounted adjacent said conveyor for movement toward and from the same, said neck forming bar having an edge which is adapted to be positioned in opposed relation to the outer edges of the bars of a cross bar assembly and which is adapted to move in a direction transversely of the path of movement of the casing so as to force a portion of a stuffed casing into a slot and constrict the same, and a holding bar for each cross bar assembly which holding bar is mounted on the conveyor for movement in a direction transversely of the conveyor so as to engage over a constricted portion of the casing whereby to hold the casing on the conveyor and permit withdrawal of the neck forming cross bar.

4. Apparatus for linking stuffed sausage casing comprising a traveling conveyor having a pair of transversely spaced, side members, cross bar assemblies arranged between said side members and spaced longitudinally a distance apart which is equal to the length of a sausage link, each assembly including a pair of plate-like bars extending in parallel planes which are normal to the path of travel of the conveyor, each of the bars having outwardly opening generally V-shaped slots in their outer edges with the slots aligned in the longitudinal direction so as to receive longitudinally extending lengths of stuffed sausage casing, a pair of plate-like neck forming cross bars mounted adjacent the conveyor and extending in planes which are parallel to the planes of the slotted cross bars when the latter are moved into edge opposed relation therewith and which are spaced apart a distance sufficient to accommodate between them a cross bar assembly, means for effecting relative movement between a cross bar assembly on the conveyor and the neck forming cross bars to force portions of the sausage casings into the slots in the cross bars so as to constrict the same, and said cross bar assemblies including a neck locking bar having hook formations on the outer edge which are adapted to move across the V-shaped slots and hold the constricted casing portions in constricted relation in the bottom of the slots thereby to permit separation of the neck forming bars and the cross bar assembly while holding the casing on the latter.

5. In a machine for linking and processing stuffed sausage casing, a traveling conveyor having a plurality of pairs of cross bars which are spaced in the longitudinal direction a distance apart equal to the length of a sausage link, said cross bars having one or more outwardly opening generally V-shaped slots in their outer edges with the slots aligned in the longitudinal direction so as to receive therein a length of stuffed casing, a neck forming bar mounted adjacent said conveyor for cooperation with said cross bars to force a portion of the casing toward the bottom of each slot and constrict the same, a holding bar movably mounted on said conveyor for cooperation with each pair of said cross bars, said holding bars having hook formations along the outer edges, means for moving each of said holding bars into position for engaging a constricted portion of the casing when the latter is moved into the bottom of the slots in the associated cross bars by said neck forming bar to permit separation of the cross bars and the neck forming bar, and means for retracting the holding bar to release the casing for removal from the conveyor.

6. In a machine for linking and processing stuffed sausage casing, a traveling conveyor having cross bars which are spaced in the longitudinal direction a distance apart equal to the length of a sausage link, said cross bars having one or more outwardly opening slots with the slots arranged to receive therein a stuffed sausage casing, a neck forming bar mounted adjacent said conveyor for cooperation with a cross bar to force a portion of the casing into constricted relation in a slot, holding bars movably mounted on said conveyor adjacent said cross bars, said holding bars having locking formations for engaging a constricted portion of the casing when the latter is moved into a slot in a cross bar by said neck forming bar.

7. Apparatus for linking stuffed sausage casing comprising a traveling conveyor having a pair of transversely spaced side members, plate-like cross bars arranged in pairs and spaced longitudinally a distance apart which is equal to the length of a sausage link, the bars of each pair thereof extending in parallel planes which are normal to the path of travel of the conveyor and having outwardly opening generally V-shaped notches in their outer edges with the notches aligned in the longitudinal direction so as to accommodate longitudinally extending lengths of stuffed casing, a pair of plate-like neck forming cross bars mounted adjacent the conveyor in planes which are parallel to the planes of the notched cross bars when they are in edge opposed relation and which are spaced apart a distance sufficient to accommodate between them a pair of the notched cross bars, means for effecting relative movement between a pair of the notched cross bars on the conveyor and the neck forming bars to force portions of the sausage casing toward the bottom of the notches in the cross bars so as to constrict the same, and a neck locking bar mounted for sliding movement on spaced guide pins between each pair of cross bars on the conveyor, said locking bar having hook formations on the outer edge which are adapted to move across the V-shaped notches and hold the constricted casing portions in constricted relation in the bottom of the notches thereby to permit separation of the neck forming bars and the notched cross bars while holding the casing on the notched cross bars, said neck locking bar having spaced elongated guide slots for receiving the guide pins and said guide slots having portions inclined away from the outer edge of said bar to cause the hook formations thereon to move in a diagonal path into engagement with the casing when said bar is moved into neck locking position.

8. In a machine for linking stuffed sausage casing, a movable support having cross bar assemblies which are spaced a distance apart corresponding to the length of the link desired, said bar assemblies comprising a bar member having an outwardly opening neck forming slot with converging side edges and a neck retaining pocket at the inner terminus thereof, means associated with the bar members for forcing a section of stuffed casing into the slot to constrict the casing and position the constricted portion of the casing in the pocket, and means for retaining the constricted portion of the casing in said pocket comprising a locking member having neck engaging portions adapted to be moved into position relative to said pocket to prevent removal of the constricted casing from the pocket.

9. In a machine for linking stuffed sausage casing, a movable support having a series of parallel cross bar assemblies which are spaced apart a distance corresponding to the length of link desired, said bar assemblies each comprising a plate-like bar member fixed on the support and having a casing receiving notch opening outwardly of the outer edge of said bar member, which notch has oppositely disposed side edges with one side edge generally V-shaped so as to form a pocket opening toward the other side edge, a movable plate-like bar member mounted on said support in parallel, closely adjacent sliding relation with said fixed bar member, said movable bar member having a casing receiving notch opening outwardly of the outer edge thereof for co-operation with the notch in said fixed bar member to receive, when in open position, the stuffed casing, the notch in said movable bar member having oppositely disposed side edges, one of which is generally V-shaped so as to form a pocket opening toward the other side edge and disposed oppositely of the pocket in the fixed bar member, and means to move said bar members relative to each other to bring the edges defining the notches therein into engagement with the casing thereby to constrict the casing and position the constricted portion of the casing in the pocket forming portions of the notches in the bar members.

10. In a machine for linking stuffed sausage casing, a movable support having a series of parallel cross bar assemblies which extend laterally of said support and are spaced apart a distance corresponding to the length of link desired, said cross bar assemblies each comprising a bar member fixed on the support and a co-operating bar member movably mounted on said support adjacent said fixed bar member, said fixed bar member having a casing constricting slot opening outwardly of the member, which slots has converging edge portions and a cylindrical pocket at the terminus of said edge portions, said cylindrical pocket being of small diameter, said movable bar member being mounted on said support in sliding relation with said fixed bar member and having an outwardly opening complementary slot for co-operation with the slot in said fixed bar to receive, when in one position, the stuffed casing, the slot in said movable bar member having converging edge portions and a cylindrical pocket at the terminus of said edge portions, said cylindrical pocket being of small diameter, the bar members being disposed relative to each other so that the edge portions of each slot in the respective bar members converge toward each other and diverge from the corresponding edge portions of the slot in the other bar member whereby when the bar members are moved relative to each other in a direction crosswise of said support a portion of the casing is constricted and the constricted portion is retained in the pockets.

11. In a machine for linking stuffed sausage casing, a movable support having cross bar assemblies which are spaced a distance apart which corresponds to the length of link desired, said bar assemblies each comprising a bar member having on its outer edge a plurality of outwardly opening neck forming notches each of which has a laterally facing edge portion in the form of a V and a pocket formation of relatively small diameter at the apex of the V, the mouth of each notch being of sufficient width to receive a stuffed sausage casing, a second bar member mounted for movement laterally of said support in a plane which is parallel with said notched bar member and having on its outer edge outwardly opening notches, each of said notches on said second bar member co-operating in one position of said second bar member with a notch in said first mentioned bar member to receive a stuffed casing moved therein from the outer edges of said bar members, means for moving said second bar member relative to said first bar member to force sections of the casings laterally into said pockets and thereby constrict the same, and means for holding the bar members in position for retaining the constricted portions of the casings in said pockets.

12. In a machine for linking and processing stuffed sausage casing, a traveling conveyor having cross bar assemblies which are spaced in the longitudinal direction a distance apart equal to the length of a sausage link, said cross bar assemblies having one or more outwardly opening slots which in the open position are arranged to receive therein stuffed sausage casings, said cross bar assemblies each including a pair of notched bars which are movable relative to each other in a direction transversely of the path of the conveyor and in parallel planes, said notched bars having co-operating V-shaped notch formations which are in oppositely disposed paired relation and which have small diameter pocket formations at the apex of the V, said notch formations in one position of the bars constituting said outwardly opening slots and receiving therein the stuffed sausage casings, and means for moving one of said bars of each pair thereof relative to the other bar of said pair to bring the notch formations toward each other whereby the casings are constricted and moved into the pocket formations in the slots, and releasable means for holding the constricted casings in the pocket formations of at least one of said bars during predetermined travel of the conveyor.

References Cited in the file of this patent

UNITED STATES PATENTS

| | | |
|---|---|---|
| 1,936,354 | Edwards | Nov. 21, 1933 |
| 2,052,092 | Hillery | Aug. 25, 1936 |
| 2,234,054 | Mason | Mar. 4, 1941 |
| 2,874,403 | Lampard | Feb. 24, 1959 |
| 2,980,949 | Stroh | Apr. 25, 1961 |